Patented Mar. 3, 1942

2,275,045

UNITED STATES PATENT OFFICE 2,275,045

RECOVERY OF PHENOLS FROM AQUEOUS SOLUTIONS OF THEIR SALTS

John J. Grebe, Midland, Mich., assignor to The Dow Chemical Company, Midland, Mich., a corporation of Michigan No Drawing. Application July 3, 1939, Serial No. 282,623

11 Claims. (Cl. 260—621)

This invention relates to the recovery of phenolic compounds from aqueous solutions of the corresponding calcium phenolates, such as are obtained by the hydrolysis of aryl halides with aqueous calcium hydroxide or by reaction between a sodium phenolate and a calcium compound.

In the manufacture of phenolic compounds, e. g. phenol, cresols, naphthols, etc., by hydrolysis of the corresponding aryl halides with an excess of calcium hydroxide, a large proportion of the phenol formed in the reaction is initially obtained in the form of its calcium salt, i. e. calcium phenate, calcium cresolate, calcium naphtholate, etc., and it has heretofore been the practice to liberate the free phenol from such salt by treating with an acid. For example, in the manufacture of phenol itself ($C_6H_5OH$) by reaction between chlorbenzene and an aqueous suspension of calcium hydroxide at elevated temperatures and pressures, approximately 70-80 per cent of the phenol is initially obtained in the form of calcium phenate. In order to recover the phenol present in this form, the reaction mixture is acidified with a strong mineral acid, such as hydrochloric or sulphuric acid, to decompose the calcium phenate, and the phenol is steam-distilled from the acidified mixture.

I have now found that the calcium phenolates, e. g. calcium phenate, calcium cresolate, calcium p-ethylphenate, calcium naphtholate, etc., readily undergo hydrolysis when heated with water at elevated temperatures and under superatmospheric pressures to form calcium hydroxide and the free phenolic compound. The calcium hydroxide, being practically insoluble in water at elevated temperatures, precipitates from solution as it is formed, and the hydrolysis, which is an equilibrium reaction, goes to completion. The free phenol may be separated from the precipitated calcium hydroxide by decantation, filtration, distillation, extraction, etc.

This discovery enables a free phenol to be separated from a solution of the corresponding calcium phenolate without necessity for acidifying the solution. The cost of the acid and the extra operation of acidification are thus saved, constituting a material economy in manufacturing costs. A further advantage is that calcium hydroxide is recovered as a valuable by-product, whereas it would be destroyed were acidification employed.

The recovery of a free phenol from an aqueous calcium phenolate solution according to the invention is preferably carried out by heating the solution under a pressure between about 250 and about 3000 pounds per square inch and at a temperature corresponding to the boiling point of the solution at such pressure, i. e. at a temperature of approximately 175°–375° C., although, as shown by the data presented below, any pressure substantially above atmospheric pressure and the corresponding boiling temperature can be employed, provided the temperature is not so high as to cause decomposition of the phenol. As the hydrolysis proceeds, calcium hydroxide is precipitated in a granular and rapidly-settling form, and the resulting product consists of a precipitate of calcium hydroxide and a liquid phase comprising the free phenolic compound and water. The separation of the phenol from such mixed product is carried out at elevated temperatures and pressures in order to avoid re-formation of the calcium phenolate, and may readily be effected by decanting or filtering the liquid from the precipitated calcium hydroxide and thereafter recovering the phenol from the liquid mixture by any suitable process, such as extraction, steam-distillation, etc. A more direct mode of recovering the phenol from the mixed reaction product consists simply in distilling a mixture of steam and the phenol from the precipitated calcium hydroxide under superatmospheric pressure.

The process may be carried out continuously or discontinuously as desired. When operating in a continuous manner, the aqueous calcium phenolate solution is pumped through a tubular autoclave system under a pressure substantially above atmospheric pressure, e. g. 250–3000 pounds per square inch, and at the corresponding boiling temperature, e. g. 175°–375° C., whereby the hydrolysis reaction is caused to take place, and thence into a separator maintained under pressure and at an elevated temperature, where the phenol and the calcium hydroxide are continuously separated, either by decantation, filtration, extraction, or distillation as hereinbefore described. In a preferred mode of operation, the separator is equipped with a pressure relief valve or throttling device which will permit a mixture of steam and phenol vapor to be continuously discharged into a condenser maintained at atmospheric pressure. The calcium hydroxide is withdrawn from the separator and the phenol is recovered from the aqueous condensate by decantation, extraction, or other suitable procedure.

The following table presents data illustrating the effect of pressure and temperature on the yield of phenol obtained by the hydrolysis of aqueous calcium phenate (Ca(OC₆H₅)₂) solutions. In runs Nos. 1–3, the calcium phenate solution was prepared by agitating a mixture of 161 parts by weight of calcium hydroxide, 265 parts of phenol, 219 parts of calcium chloride, and 3600 parts of water at 80° C. for 1 hour. This solution had a composition approximating that of the reaction product obtained by hydrolyzing chlorbenzene with calcium hydroxide. In each run, this solution was distilled to dryness under the conditions of temperature and pressure given in the table. The condensate, comprising a phenol layer and a water layer, was then analyzed for total phenol and the per cent recovery of phenol was calculated. In runs 4–9, the calcium phenate solution, which was prepared by agitating a mixture of 161 parts by weight of calcium hydroxide, 265 parts of phenol, and 3000 parts of water at 80° C. for 4 hours and thereafter filtering off the excess calcium hydroxide, was placed in an autoclave and heated under the given conditions for the given time, after which the discharge valve of the autoclave was opened and a mixture of steam and phenol vapor was led off and condensed. The condensate was then analyzed and the per cent recovery calculated as in runs 1–3.

*Table*

| Run No. | Gauge pressure | Temperature | Time of heating | Phenol recovery |
|---|---|---|---|---|
| | Lbs./sq. in. | °C. | | Per unit |
| 1 | 0 | 115 | | 43.2 |
| 2 | 32 | 130 | | 67.0 |
| 3 | 73 | 158 | | 76.7 |
| 4 | 250 | 190 | Heated to temperature | 86.4 |
| 5 | 475 | 225 | do | 88.5 |
| 6 | 500 | 228 | do | 89.1 |
| 7 | 500 | 228 | 1 hour | 91.9 |
| 8 | 700 | 250 | do | 91.7 |
| 9 | 850 | 260 | do | 92.5 |

The data obtained in runs 6 and 7 show that the hydrolysis of calcium phenate takes place very rapidly at a temperature of about 225° C. and under a pressure of about 500 pounds per square inch. Accordingly, it will be seen that under these conditions substantially complete hydrolysis may be effected in a very short time with little expenditure of heat.

The invention is not limited to the recovery of phenols from aqueous calcium phenolate solutions obtained by hydrolyzing aryl halides with aqueous calcium hydroxide, but may advantageously be applied to any process wherein a phenol is obtained in the form of a metal salt. For example, in previously known processes wherein an aryl halide is hydrolyzed with sodium hydroxide or wherein an aryl sulphonic acid is fused with sodium hydroxide, practically all of the phenol formed is obtained in the form of a sodium phenolate and is recovered therefrom by treatment with an acid. By converting the sodium phenolate into the corresponding calcium phenolate through reaction with an inexpensive calcium salt, e. g. calcium chloride, and thereafter recovering the phenol according to the invention, it is possible to eliminate the expensive and inconvenient acidification treatment and thereby effect a substantial reduction in manufacturing cost. Such process is conveniently carried out by heating the sodium phenolate liquor with an aqueous solution of calcium chloride or other soluble calcium salt, whereby there is formed aqueous calcium phenolate which is then hydrolyzed and the free phenol recovered as hereinbefore described. The following table presents data illustrating such mode of procedure. These data were obtained by mixing sodium phenate liquor, obtained by the caustic soda hydrolysis of chlorbenzene, with a 6 per cent excess of a 40 per cent aqueous calcium chloride solution, and heating the resultant mixture at the given temperature for the given length of time. A mixture of steam and phenol vapor was then allowed to discharge from the reaction vessel under its own pressure into a condenser maintained at atmospheric pressure, and the condensate was analyzed for phenol.

*Table*

| Run No. | Temperature | Time of heating | Phenol recovery |
|---|---|---|---|
| | °C. | Hours | Percent |
| 1 | 295 | 1 | 89.7 |
| 2 | 297 | 1 | 95.6 |
| 3 | 333 | ¼ | 87.4 |

Other modes of applying the principle of my invention may be employed instead of those explained, change being made as regards the method herein disclosed, provided the step or steps stated by any of the following claims, or the equivalent of such stated step or steps be employed.

I, therefore, particularly point out and distinctly claim as my invention:

1. In a method of recovering a phenol from an aqueous solution of a calcium salt of the phenol, the steps which consist in heating the solution at a temperature substantially above its normal boiling point to hydrolyze the calcium salt of the phenol, and holding the reaction mixture at said temperature under a pressure substantially above atmospheric pressure while separating insoluble calcium hydroxide from the liquid mixture containing the free phenol.

2. The method of separating a phenol from an aqueous solution of a calcium salt of the phenol which comprises heating the solution at a temperature substantially above its normal boiling point to hydrolyze the calcium salt of the phenol, holding the reaction mixture at said temperature under a pressure substantially above atmospheric pressure while separating insoluble calcium hydroxide from the liquid mixture containing the free phenol, and separating the free phenol from said liquid mixture.

3. The method of separating a phenol from an alkali metal salt thereof which comprises treating an aqueous solution of said salt with a soluble calcium salt to form the corresponding calcium salt of the phenol, heating an aqueous solution of the latter at a temperature substantially above its normal boiling point to hydrolyze the calcium salt of the phenol, holding the reaction mixture at said temperature under a pressure substantially above atmospheric pressure while separating insoluble calcium hydroxide from the liquid mixture containing the free phenol, and separating the free phenol from said liquid mixture.

4. A method of separating a phenol from an aqueous solution of a calcium salt of the phenol which comprises heating the solution under a pressure between about 250 and about 3000 pounds per square inch at a temperature corresponding to the boiling point of the solution employed to hydrolyze the calcium salt of the phenol, holding the reaction mixture at said temperature and pressure while separating insoluble calcium hydroxide from the liquid mixture containing the free phenol, and separating the free phenol from said liquid mixture.

5. The method of separating a phenol from the aqueous solution of a calcium salt of the phenol which comprises heating the solution at a temperature substantially above its normal boiling point to hydrolyze the calcium salt of the phenol and holding the reaction mixture at said temperature under a pressure substantially above atmospheric pressure while distilling off with steam the free phenol thereby formed.

6. In a method of recovering phenol from an aqueous solution of calcium phenate, the steps which consist in heating the solution at a temperature substantially above its normal boiling point to hydrolyze the calcium phenate and holding the reaction mixture at said temperature under a pressure substantially above atmospheric pressure while separating insoluble calcium hydroxide from the liquid mixture containing the free phenol.

7. The method of separating phenol from an aqueous solution of calcium phenate which comprises heating the solution at a temperature substantially above its normal boiling point to hydrolyze the calcium phenate, holding the reaction mixture at said temperature under a pressure substantially above atmospheric pressure while separating insoluble calcium hydroxide from the liquid mixture containing the free phenol, and separating the free phenol from said liquid mixture.

8. The method of separating phenol from an aqueous solution of calcium phenate which comprises heating the solution under a pressure between about 250 and about 3000 pounds per square inch at a temperature corresponding to the boiling point of the solution under the pressure employed to hydrolyze the calcium phenate, holding the reaction mixture at said temperature under a pressure substantially above atmospheric pressure while separating insoluble calcium hydroxide from the liquid mixture containing the free phenol, and separating the free phenol from said liquid mixture.

9. The method of separating phenol from an aqueous solution of sodium phenate which comprises treating the solution with a soluble calcium salt to form calcium phenate, heating an aqueous solution of the latter under a pressure between about 250 and about 3000 pounds per square inch at a temperature corresponding to the boiling point of the solution under the pressure employed to hydrolyze the calcium phenate, holding the reaction mixture at said temperature under a pressure substantially above atmospheric pressure while separating insoluble calcium hydroxide from the liquid mixture containing the free phenol, and separating the free phenol from said liquid mixture.

10. The method of separating phenol from an aqueous solution of calcium phenate which comprises heating the solution at a temperature substantially above its normal boiling point to hydrolyze the calcium phenate, and holding the reaction mixture at said temperature under a pressure substantially above atmospheric pressure while distilling off with steam the free phenol thereby formed.

11. The method of separating phenol from an aqueous solution of sodium phenate which comprises treating the solution with a soluble calcium salt to form calcium phenate, heating an aqueous solution of the latter at a temperature substantially above its normal boiling point to hydrolyze the calcium phenate, and holding the reaction mixture at said temperature under a pressure substantially above atmospheric pressure while distilling off with steam the free phenol thereby formed.

JOHN J. GREBE.